(12) United States Patent
Yoshikawa et al.

(10) Patent No.: US 7,440,049 B2
(45) Date of Patent: Oct. 21, 2008

(54) BACKLIGHT DEVICE FOR LIQUID CRYSTAL DISPLAY

(75) Inventors: Toshiyuki Yoshikawa, Tsukuba (JP); Yoshiki Mukoo, Tsukuba (JP); Ichiro Matsuzaki, Nakajho-machi (JP)

(73) Assignee: KURARAY Co., Ltd., Okayama (JP)

( * ) Notice: Subject to any disclaimer, the term of this patent is extended or adjusted under 35 U.S.C. 154(b) by 14 days.

(21) Appl. No.: 10/588,338

(22) PCT Filed: Feb. 7, 2005

(86) PCT No.: PCT/JP2005/001751

§ 371 (c)(1),
(2), (4) Date: Aug. 3, 2006

(87) PCT Pub. No.: WO2005/076058

PCT Pub. Date: Aug. 18, 2005

(65) Prior Publication Data

US 2007/0103929 A1    May 10, 2007

(30) Foreign Application Priority Data

Feb. 9, 2004   (JP) .............................. 2004-032497

(51) Int. Cl.
*G02F 1/1335* (2006.01)
*G02B 5/02* (2006.01)

(52) U.S. Cl. ...................... 349/112; 349/113; 362/558

(58) Field of Classification Search ................. 349/112, 349/113; 362/558
See application file for complete search history.

(56) References Cited

U.S. PATENT DOCUMENTS

2002/0154260 A1 * 10/2002 Uchida et al. ............... 349/112

FOREIGN PATENT DOCUMENTS

| JP | 54-155244 | 12/1979 |
| JP | 01-172801 | 7/1989 |
| JP | 55-147514 | 11/1990 |

(Continued)

OTHER PUBLICATIONS

Nikkei Microdevice, Jun. 2003 p. 73, Published by Nikkei BP Co., Ltd. with abridged English translation.

*Primary Examiner*—Frank G Font
*Assistant Examiner*—Michael P Mooney
(74) *Attorney, Agent, or Firm*—Licata & Tyrrell P.C.

(57) ABSTRACT

A backlight device for a liquid crystal display comprising a light diffuser, a light source disposed behind the light diffuser, and a reflector for reflecting light from the light source, in which a liquid crystal panel is disposed in front of the light diffuser and irradiated, from the back side, with the direct light from the light source and the light reflected by the reflector and diffused by and passed through the light diffuser. The light source is of a type which radiates UV-rays and heat along with visible light. The warp and yellowing of the diffuser are suppressed even if the quantity of UV-rays is increased with an increase in the quantity of light from the light source. In a direct-under type backlight device for a liquid crystal display employing the light diffuser, the color difference (ΔE) defined in JIS K 7105 after exposed for 500 hours to artificial light employed for artificial light source test defined in JIS h7350-2 is 2.0 or less, and saturated water absorption rate of the light diffuser is 0.9% or less.

10 Claims, 2 Drawing Sheets

FOREIGN PATENT DOCUMENTS

| | | |
|---|---|---|
| JP | 03-143950 | 6/1991 |
| JP | 06-345925 | 12/1994 |
| JP | 11-223812 * | 8/1999 |
| JP | 2001-305335 * | 10/2001 |
| JP | 2002-221608 | 8/2002 |

* cited by examiner

BACKLIGHT DEVICE FOR LIQUID CRYSTAL DISPLAY

This patent application is the National Stage of International Application No. PCT/JP2005/001751, filed Feb. 7, 2005, which claims the benefit of priority from Japanese Application No. 2004-032497, filed Feb. 9, 2004, each of which are herein incorporated by reference in their entirety.

TECHNICAL FIELD

The present invention relates to a backlight device for a liquid crystal display in which the liquid crystal panel is illuminated from backside.

The present invention, more specifically, relates to a backlight device for a liquid crystal display, which has an excellent light diffusivity, in which a diffuser plate positioned at the surface of the backlight device is less likely to be subject to deformation such as warp and deflection, and which also has an excellent durability, whereby yellowish tone in transmitted light is suppressed.

BACKGROUND ART

In recent years, in the field of liquid crystal displays, most notably in TV applications, there has been increasing demand for displays with larger screens, higher luminous intensities, smaller thicknesses, and better luminance uniformity. For this reason, direct-type backlight systems have been used, which comprise in combination a light source using multiple cold-cathode tubes, a reflector provided in the backside, and a diffuser plate constituting a luminescent surface. While such a device has a high effective utilization factor of the light flux radiated from the light source (the ratio of the light flux radiated from the luminescent surface to that radiated from the lamp) and makes it possible to increase the number of light sources to be used thereby facilitating the enhancement of the intensity of the luminescent surface, it has a problem in that the luminance uniformity of the luminescent surface is degraded since the luminous intensity is increased just above the light source. This problem would be pronounced especially when the thickness of the backlight device is reduced.

Conventionally, in order to obtain a backlight device which combines two contradictory features; effective utilization of light and elimination of the lamp image from the light source, a method for obtaining a diffuser plate to be used therefor has been investigated in which inorganic particulates or cross-linked organic particulates are mixed as the light diffusing agent with substrate resin, for example, methacrylate resins, polycarbonate resins, styrene resins, and vinyl chloride resins (see patent document 1).

For example, from a viewpoint of transparency and resistance to ultra-violet rays, method of using methacrylate resins as the substrate resin has been investigated (see, patent document 2). However, a diffuser plate made of methacrylate resin has the problem in that it is likely to be subject to dimensional changes and warping due to moisture absorption. The space formed by the light source, the reflector, and the diffuser plate tends to have a smaller volume per unit display area since the distance between the reflector and the diffuser plate tends to be smaller, for example, not more than 15 mm due to the demand for thinner liquid crystal displays in recent years. As the result, the temperature rise curve after turning on the light source tends to be increasingly steeper; for example, the temperature at the light-source side of the diffuser plate tends to reach not lower than 50° C. within one hour after the light source is turned on, thereby more significantly affecting the warping and deflection of the diffuser plate. Since, in a backlight device, multiple sheets of various optical films such as a diffusion sheet may be disposed on the top surface of the diffuser plate, warping or deflection of the light diffuser plate may cause warping or deflection of the various optical films disposed on the top of the light diffuser plate eventually causing wrinkles thereon. As the result, in the region where wrinkles are generated, a problem arises in the form of a defect on the display surface. Moreover, unstable dimensions of the light diffuser plate will not only impede the assembly of the backlight device, but also negatively affect the product quality after manufacture.

On the other hand, from a viewpoint of preventing the occurrence of warp and deflection, there have been proposed methods utilizing a substrate resin which is less moisture absorbent than methacrylate resins, including a method utilizing polycarbonate resins (for example, see patent document 3) and a method utilizing styrene resins (for example, see patent document 4).

The luminescence principle of the cold cathode tube used in a direct-type backlight device is as follows: in a tube within which rare gas such as argon is enclosed in addition to mercury to improve the luminous efficiency, (i) electrons are released from the cathode by a high electric field applied to the electrodes, (ii) the electrons are accelerated by the high electric field to collide with mercury atoms thereby exciting the mercury atom, (iii) since the excited mercury atoms are unstable, they quickly return to a stable condition, releasing excess energy thereof in the form of ultraviolet radiation (mostly of 253.7 nm), and (iv) fluorescent substance absorbs this ultraviolet radiation and gets excited to emit light by transforming the ultraviolet radiation into visible light. It is known that a lamp, consequently, emits ultraviolet radiation of 254 nm, which is emitted by mercury and is essentially unnecessary, and other ultraviolet radiations such as of 365 nm (for example, see non-patent document 1). As has been described so far, as the number of fluorescent tubes increases and the luminous intensity per single tube increases from the demand for higher luminous intensity, increasingly larger amount of ultraviolet radiation tend to be emitted. In addition to that, as the distance between the diffuser plate and the light source is reduced from the demand for thickness reduction, and the ultraviolet energy illuminating the diffuser plate just above the tube tends to increase further, higher resistance to ultraviolet rays is demanded more than ever for the light diffuser plate to be used under such light sources.

[Patent Document 1] JP,A,54-155244.
[Patent Document 2] JP,A,01-172801.
[Patent Document 3] JP,A,03-143950.
[Patent Document 4] JP,A,06-345925.
[Non-patent Document] NIKKEI MICRODEVICE, p 73, June 2003, Published by NIKKEI BP Co., Ltd.

DISCLOSURE OF THE INVENTION

Problems to be Solved by the Invention

Accordingly, it is an object of the present invention to provide a backlight device for a liquid crystal display using at least a light source for radiating ultraviolet rays and heat along with visual light, a reflector disposed at the backside of the light source and for reflecting the light therefrom, and a light diffuser plate consisting primarily of transparent resin for diffusing and transmitting the direct light from the light source and the reflected light from the reflector, the backlight device for a liquid crystal display being characterized in that the light diffuser plate is not likely to be subject to deformation such as warping and deflection, and is highly resistant to ultraviolet rays.

Means for Solving the Problem

While diligently conducting a study to solve the above described problems, the inventors of the present invention have focused on the problem of degradation of the chromaticity of the light diffuser plate due to ultraviolet rays, which would lead to yellowish tone of the transmitted light, as well as the improvement on warping and deflection, and have further continued the study to solve these problems to find that material having a saturated water absorption rate below a certain level and a color difference below a certain color difference (ΔE) level is excellent as the component of the light diffuser plate of the backlight device, eventually completing the present invention.

Accordingly, the present invention is:
1) a backlight device for a liquid crystal display comprising a light diffuser plate, a light source disposed at a backside of the diffuser plate, and a reflector for reflecting the light from the light source, wherein a liquid crystal panel is disposed at a frontside of the light diffuser plate; and the direct light from the light source and the reflected light from the reflector diffuse into and transmit through the light diffuser plate to illuminate the liquid crystal panel from backside, the backlight device for a liquid crystal display characterized in that:

the light source radiates ultraviolet rays and heat along with visible light; and the light diffuser plate is constrained at at least one side thereof, and has a saturated water absorption rate of not more than 0.9% as well as a color difference (ΔE) of not greater than 2.0 as specified in JIS K 7105after being exposed for 500 hours to an artificial light used for an artificial light source test specified in JIS K7350-2.

Further, the present invention is:
2) the backlight device for a liquid crystal display according to the above described backlight device 1) for a liquid crystal display, wherein the light diffuser plate is one consisting of light diffusive (meth)acryl-styrene copolymer resin.

Further, the present invention is:
3) the backlight device for a liquid crystal display according to the above described backlight device 1) or 2)for a liquid crystal display, wherein the light diffuser plate contains 0.005 to 2 parts by mass of an ultraviolet absorbing agent with respect to 100 parts by mass of light diffusive resin consisting primarily of transparent resin.

Further, the present invention is:
4) the backlight device for a liquid crystal display according to any of the above described backlight devices 1) to 3) for a liquid crystal display, wherein the light diffuser plate contains 0.1 to 20 parts by mass of particulates with a particle diameter 1 to 30 μm with respect to 100 parts by mass of the light diffusive resin consisting primarily of transparent resin.

Further, the present invention is:
5) the backlight device for a liquid crystal display according to any of the above described backlight devices 1) to 4) for a liquid crystal display, wherein a maximum value of light energy at wavelengths 300 to 400 nm at a surface of the light-source side of the diffuser plate is not less than 20 μW/cm².

Further, the present invention is:
6) the backlight device for a liquid crystal display according to any of the above described backlight devices 1) to 5) for a liquid crystal display, wherein the maximum value of light energy at wavelengths not greater than 300 nm at the surface of the light-source side of the light diffuser plate is not less than 50 μW/cm².

Advantages of the Invention

The backlight device for a liquid crystal display according to the present invention comprises a light diffuser plate that is a transparent resin plate, a light source disposed at the backside of the light diffuser plate, and a reflector for reflecting the light from the light source, wherein a liquid crystal panel is disposed at the frontside of the light diffuser plate, and the direct light from the light source and the reflected light from the reflector diffuse into and transmit through the light diffuser plate to illuminate the liquid crystal panel from backside, the backlight device for a liquid crystal display being advantageous in that it has an excellent light diffusivity, the diffuser plate is less likely to be subject to warping and deflection and is highly resistant to ultraviolet rays, and yellowing in the transmitted light is suppressed.

DESCRIPTION OF SYMBOLS

Figure 1:
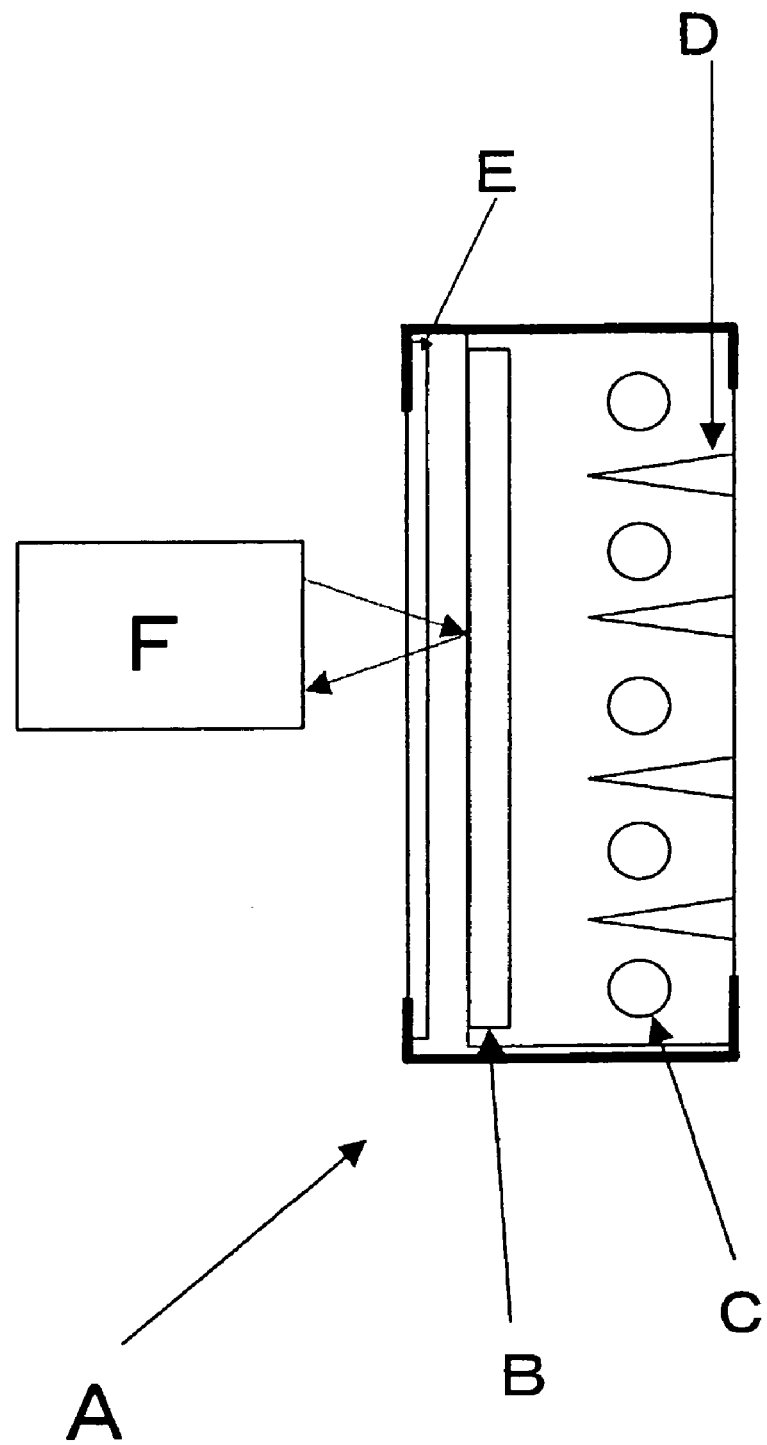
FIG. 1 illustrates a schematic view of the evaluation liquid crystal TV set used for warp evaluation.

A Evaluation liquid crystal TV set
B Formed specimen (light diffuser plate)
C Cold-cathode tube
D Reflector
E Transparent glass
F Laser displacement meter

BEST MODE FOR CARRYING OUT THE INVENTION

Hereinafter, the present invention will be described in detail.

The backlight device of the present invention comprises at least a light source for radiating ultra violet rays and heat along with visible light, a reflector for reflecting the light from the light source, and a light diffuser plate consisting primarily of transparent resin and for diffusing and transmitting the direct light from the light source and the reflected light from the reflector.

The light source used in the backlight device of the present invention generally utilizes a fluorescent tube for radiating ultraviolet rays and heat along with visual light. From a viewpoint of reducing heat generation, a cold-cathode tube is preferably used. Moreover, the shape of the fluorescent tube maybe selected from, but not limited to, such shapes as linear, L-, and C-shapes depending on the requirement in design.

The reflector used in the backlight device of the present invention preferably has, without limitation, a high reflectivity. Moreover, it may have a plane shape or a convex shape between the fluorescent tubes.

The light diffuser plate used in the backlight device of the present invention may consist of either a single light diffuser plate or multiple light diffuser plates stacked on top of each other.

The saturated water absorption rate of the light diffuser plate used in the backlight device of the present invention is not more than 0.9%, preferably not more than 0.8%, and more preferably not more than 0.7%. When the saturated water absorption rate is more than 0.9%, the resulting light diffuser plate is likely to be subject to a large warp or deflection due to the dimensional change caused by water absorption, which tends to cause image defects when used as a backlight device.

Furthermore, saturated water absorption rate as used herein refers to a measured value obtained by the measurement method described later.

The light diffuser plate used in the backlight device of the present invention is required to have high ultraviolet resistance. Specifically, it is required that the optical property, particularly chromaticity, of the resin base of the diffuser plate has not been significantly degraded after being exposed for 500 hours to the artificial light used in the artificial light tester specified in JIS K7350-2-1995 (ISO 4892-2:1994). Furthermore, the statement that the optical property, especially chromaticity, of the light diffuser plate of the present invention has not significantly been degraded means that the color difference after exposure (ΔE: the value obtained from the color difference equation of CIE 1976L*a*b*) specified in JISK7105-1981 is not greater than 2.0, preferably not greater than 1.5. When the color difference (ΔE) is greater than 2.0, the ultraviolet resistance is poor, which will make the stable usage for a longer period of time difficult. Moreover, the artificial light recommended for the above described artificial light exposure test is as follows. First, a xenon light source is used as the light source, and the light therefrom is filtered such that the radiation energy of the light has spectral characteristics similar to the spectral distribution of the daylight on the earth surface as specified in CIE No. 85:1989. Then, the spectral irradiance at wavelength 340 nm is set to be 0.50 W/(m$^2$*nm). At this moment, the total irradiance over the wavelength range of 290 to 800 nm will be about 550 W/m$^2$. The light radiated in this condition will provide the above described artificial light.

Although the underlying mechanism through which, in the backlight device having at least a light source for radiating ultra violet rays and heat along with visible light, a reflector for reflecting the light from the light source, and a light diffuser plate consisting primarily of transparent resin for diffusing and transmitting the direct light from the light source and the reflected light from the reflector, use of the above described diffuser plate makes the diffuser plate to be less likely to be subject to deformation such as warping and deflection as well as to be highly resistant to ultraviolet rays, thereby suppressing yellowish tone of the transmitted light, is not necessarily clear, the followings are considered to be possible causing factors.

The warping of the diffuser plate in the backlight device having at least a light source for radiating ultraviolet rays and heat along with visible light, a reflector for reflecting the light from the light source, and a light diffuser plate for diffusing and transmitting the direct light from the light source and the reflected light from the reflector, is considered to be categorized in terms of the causing factor into i) warping due to the temperature difference between opposite sides of the light diffuser plate which is caused because the light-source side is heated more than the opposite side when the light source is turned on, and ii) warping due to the difference in water absorption between opposite sides of the light diffuser plate which is caused because the light-source side is dewatered more than the opposite side due to the temperature difference between the both sides. Thus, since the light diffuser plate is constrained at its peripheral edge by being attached to a frame or the like, when the light-source side shrinks, the central portion of the light diffuser plate will warp toward the liquid crystal panel, running the risk of touching the liquid crystal panel.

It is found that due to the fact that recent backlight devices have been reduced in thickness and improved in the sealing performance more than ever, the latter factor ii) warping due to the difference in water absorption between opposite sides of the light diffuser plate will have more significant effect. Thus, it is found that a light diffuser plate which utilizes resin with lower saturated water absorption rate as the matrix is preferable. On the other hand, while (meth)acryl-styrene copolymer resins, styrene resins, polycarbonate resins, and others are preferably used as the matrix with a low water absorption, it is known that they generally have poor ultraviolet resistance and stable use thereof over a longer period of time is difficult. It is also found that preferable substrate resin to be used in the light diffuser plate of the backlight device for a liquid crystal display according to the present invention is one with a smaller color difference (ΔE) after being exposed for 500 hours to the artificial light used for the artificial light source test specified for ultraviolet resistance in JIS K7350-2-1995 as described later.

From what has been described so far, it is found that the light diffuser plate used in the backlight device for a liquid crystal display according to the present invention is required to have a color difference (ΔE) of not greater than 2.0 as specified in JIS K-7105-1981 after being exposed for 500 hours to the artificial light used in the artificial light source test specified in JIS K7350-2-1995, and a saturated water absorption rate of not more than 0.9%.

The transparent resin used for the light diffuser plate in the backlight device of the present invention is preferably thermoplastic resin having a light transmittance of not less than 80%. Specifically, such materials include (meth)acrylic resins, (meth)acryl-styrene copolymer resins, styrene resins, polycarbonate resins, cyclic olefin resins, and ethylene-vinyl acetate copolymer resins. Moreover, from a viewpoint of improving ultraviolet resistance and reducing water absorption, preferably (meth)acrylic resins, (meth)acryl-styrene copolymer resins, styrene resins, polycarbonate resins, and cyclic olefin resins, and more preferably (meth)acryl-styrene copolymer resins are used.

The (meth)acrylic ester monomer constituting (meth) acryl-styrene copolymer resins preferably used in the light diffuser plate in the backlight device of the present invention is preferably alkyl acrylate ester and/or alkyl methacrylate ester having an alkyl group with 1 to 12 carbons. Examples of the above described monomer include methyl acrylate, ethyl acrylate, propyl acrylate, butyl acrylate, 2-ethylhexyl acrylate, decyl acrylate, dodecyl acrylate, 2-hydroxyethyl acrylate, methyl methacrylate, ethyl methacrylate, propyl methacrylate, butyl methacrylate, 2-ethylhexyl methacrylate, decyl methacrylate, dodecyl methacrylate, 2-hydroxyethyl methacrylate, dimethylaminoethyl acrylate, dimethylaminoethyl methacrylate and quaternary compounds thereof, acrylamide, methacrylamide, N-methylolacrylamide, N,N-dimethylacrylamide, acrylamide-2-methylpropanesulfonic acid and sodium salts thereof. These may be used alone or in combination of two or more kinds. Among these, alkyl acrylate ester having a alkyl group with 1 to 8 carbons, alkyl methacrylate ester having an alkyl group with 1 to 8 carbons, or mixtures thereof are preferably used, and methyl methacrylate, methyl acrylate, or mixtures thereof are more preferably used.

Further, the styrene monomers include styrene, α-methyl styrene, p-styrene sulfonic acid or sodium salt or potassium salt thereof, or styrene in which a part of the benzene nucleus is replaced with an alkyl group. These can be used alone or in combination of two or more kinds. Among these, styrene, α-methyl styrene, or mixtures thereof are preferably used.

Further, the other copolymeric monomers maybe any monomer which is copolymerizable with (meth)acrylate ester monomers and styrene monomers, and include, but not limited to, other ethylene unsaturated monomers and more specifically olefins such as ethylene, propylene, isobutylene; olefin halides such as vinyl chloride, vinyl fluoride, vinylidene chloride, vinylidene fluoride; vinyl esters such as vinyl formate, vinyl acetate, vinyl propionate, and vinyl versatic; radically polymerizable polybasic acid and anhydrides thereof such as maleic acid, itaconic acid, maleic anhydride, and itaconic anhydride; maleimide monomers such as maleimide, N-methylmaleimide, N-ethylmaleimide, N-cyclohexylmaleimide, N-phenylmaleimide; acrylic acid, methacrylic acid or N-vinyl pyrrolidone. These other monomers may be used alone or in combination with two or more kinds. Although the above described other monomers are not indispensable ingredients for the (meth)acryl-styrene copolymer resin used in the present invention, they are used generally in the range of 0 to 40% by mass, preferably in the range of 0 to 20% by mass, and more preferably in the range of 0 to 10% by mass with respect to the total amount of monomers to be used.

The (meth)acryl-styrene copolymer resin preferably used in the present invention are preferably obtained through copolymerization of 30 to 70% by mass of (meth)acrylate ester monomer and 70 to 30% by mass of styrene monomer, more preferably 40 to 60% by mass of (meth)acrylate ester monomer and 60 to 40% by mass of styrene monomer, and most preferably 45 to 60% by mass of (meth)acrylate ester monomer and 55 to 40% by mass of styrene monomer. When (meth)acrylate ester monomer unit is less than 30% by mass, stiffness, surface hardness, and ultraviolet resistance will be insufficient, and thus stable usage for a long period of time will be difficult, and when more than 70% by mass, the resulting light diffuser plate is likely to be subject to a significant warp and deflection due to the dimensional change caused by water absorption, and thus defects in the image likely to occur when used as the backlight device. When styrene monomer unit is less than 30% by mass, as (meth)acrylate ester monomer unit will be increased consequently, resulting light diffuser plate is likely to be subject to a warp or deflection due to the dimensional change caused by the water absorption, thus likely to cause defects in the image when used as the backlight device, and when more than 70% by mass, the resistance to ultraviolet rays will decline and stable use of the diffuser plate for a longer period of time will become difficult. Although the underlying mechanism is not necessarily clear, it is assumed that the above described particular ranges of (meth)acrylate ester monomer and styrene monomer is a range centered around 57% by mole of methyl methacrylate/43% by mole of styrene which is a copolymer azeotropic composition of methyl methacrylate and styrene, and copolymer chains of methyl methacrylate and styrene become randomized, and such entanglement of polymer chains has decreased the free volume associated with water absorption.

The process for preparing (meth)acryl-styrene copolymer resin preferably used as the light diffuser plate in the backlight device of the present invention includes, but not limited to, a method in which polymerizing by a suspension polymerization, which is able to effectively suppress unreacted monomers, styrene dimers, and styrene trimers since removal of polymerization heat is easy and polymerization up to a high transformation rate is possible, a melt polymerization, or a polymerizing method of a bulk polymerization according to JP,B, 62-13968 is conducted, and thereafter the resulting partial copolymers are polymerized by a cast polymerization or a suspension polymerization, and a method in which polymerizing by a continuous bulk copolymerization is conducted, and thereafter unreacted monomers are recovered and removed. Preferably, suspension polymerization or bulk polymerization is used. Moreover, at the time of polymerization, aqueous polymers, surface active agents, chain transfer agents, polymerization inhibitors, and the like may be added as desired in an amount not impeding the polymerization.

The transparent resin used for the light diffuser plate in the backlight device of the present invention may include 0.005 to 2 parts by mass of ultraviolet absorbing agent with respect to 100 parts by mass of the transparent resin, thereby further improving the ultraviolet resistance of the light diffuser plate used in the backlight device of the present invention. The above described ultraviolet absorbing agent is preferably, but not limited to, a compound derived from hindered amines, benzophenones, benzotriazoles, phenyl salicylates, 2-(1-arylalkylidene) malonic esters, oxalanilides or phenyl bezoates and having its maximum absorption wavelength in the range of 240 to 380 nm. These ultraviolet absorbing agents may be used alone or in combination of two or more kinds.

The loadings of the ultraviolet absorbing agent is preferably 0.005 to 2 parts by mass, preferably 0.1 to 1 parts by mass with respect to 100 parts by mass of transparent resin. When the loading is less than 0.005 parts by mass, improvement in ultraviolet resistance will not be sufficient, and when more than 2 parts by mass, clouding and/or smudging tends to occur since the surface of the polishing roll is soiled during extrusion and problems in operation such as slipping tend to occur and therefore not desired.

The light diffuser plate used in the backlight device of the present invention may contain 0.1 to 2.0 parts by mass, preferably 0.3 to 15 parts by mass, and more preferably 1 to 10 parts by mass of light diffusing agent with respect to 100 parts by mass of transparent resin; when its content is less than 0.1 parts by mass with respect to the transparent resin, sufficient light diffusivity will not be achieved, and when greater than 20 parts by mass, sufficient total light transmittance will not be obtained, and also its intensity will not be sufficient.

Further, the particle diameter of the light diffusing agent is preferably in the range of 1 to 30 μm in average particle diameter, and more preferably in the range of 2 to 20 μm. When the average particle diameter of the light diffusing agent is less than 1 μm, resulting light diffusing resin composition obtained by dispersing the particles in transparent resin will selectively scatter light with short wavelengths thereby causing the transmitted light to have yellowish tone, which is not preferable. On the other hand, the average particle diameter is greater than 30 μm, the resulting light diffusing resin composition obtained by dispersing the particles in transparent resin tends to have lowered light diffusivity, or the light diffusing agent tends to be visually spotted as a foreign object when light transmits the resin, which is not preferable. The shape of light diffusing agent is preferably in a form somewhere between spheroidal or spherical shape, and more preferably spherical.

The term "average particle diameter" used herein refers to the average particle diameter obtained from actual measurements using photography obtained through electron microscope observation as described below.

As the light diffusing agent, typically, inorganic and/or organic transparent particulates having a different refractivity from that of the transparent resin of the matrix are used. The difference in the refractivity between the light diffusing agent and that of the matrix is preferably not less than 0.02 in the absolute value from the viewpoint of light diffusivity, and not less than 0.15 from the viewpoint of light transmissivity. Moreover, in the present invention, it is possible to impart so called internal diffusivity by providing a difference in refractivity between the light diffusing agent and the matrix as described above; it is also possible to impart so called external diffusivity by making the light diffusing agent stand out from the matrix surface thereby forming surface asperities.

The inorganic light diffusing agent includes calcium carbonate, barium sulfate, titanium oxide, aluminum hydroxide, silica, glass, talc, mica, white carbon, magnesium oxide, and zinc oxide, and these may be surface treated with fatty acid or the like. Moreover, the organic light diffusing agent includes styrene polymer particles, acrylic polymer particles, siloxane polymer particles, and fluorine polymer particles, and a highly heat-resistant light diffusing agent of which the temperature for 3% by mass reduction in the air is not lower than 250° C., and cross-linked polymer particle of which gel fraction when resolved into acetone is not less than 10% are preferably used. Among these light diffusing agents, silica, glass, acrylic polymer particles, and siloxane polymer particles are preferably used, and acrylic polymer particles and siloxane polymer particles are more preferably used. Moreover, two or more kinds of these light diffusing agents may be used as needed.

The process for preparing light diffusing resin compositions used in the light diffuser plate in the backlight device of the present invention may adopt, for example, but not limited to, a process of premixing transparent resin pellet with light diffusing agent and extruding or injection-molding the mixture to obtain a light diffusing resin composition in the form of pellet or the like; a process of adding light diffusing agent to transparent resin while it is being extruded or injection-molded to obtain a light diffusing resin composition in the form of pellet or the like; or a process of producing a master batch of transparent resin and light diffusing agent and thereafter extruding or injection-molding the transparent resin and the master batch for the second time so that a desired formulation is obtained to achieve a light diffusing resin composition in the form of pellet or the like.

It is preferable that yellowing of transmitted light due to time course deterioration of the diffuser plate_is suppressed even when the maximum light energy at wavelengths 300 to 400 nm is not less than 20 µW/cm$^2$ at the light-source side of the light diffuser plate used in the backlight device of the present invention. More preferably, yellowing of transmitted light due to time course deterioration of the diffuser plate_is suppressed even when the above described energy is not less than 30 µW/cm$^2$. It is also preferable that yellowing of transmitted light due to time course deterioration of the diffuser plate_is suppressed even when the leakage of primary light emission energy of mercury, of which wavelength is not larger than 300 nm, is not less than 50 µW/cm$^2$. More preferably, yellowing of transmitted light due to time course deterioration of the diffuser plate is suppressed even when the above described energy is not less than 75 µW/cm$^2$. This makes it possible to cope with the increase in the amount of ultraviolet rays caused by increased luminous intensity of the light source.

The light diffusing resin composition obtained as described so far and used in the light diffuser plate in the backlight device of the present invention may be subjected to various molding processes such as those applied to typical thermoplastic resin, thereby producing a light diffuser plate of any shape and/or size. Such molding processes may include various molding processes such as, but not limited to, extrusion, injection, blowing, calendering, pressing, and the like. Moreover, it is also possible to add and mix the light diffusing agent used in the present invention with the substrate resin forming monomer during direct casting to polymerize and form them into a plate, film, and other molds. Moreover, by extruding the above described composition and other material through a feedblock, multi-manifold die, or roll unit using two or more extrusion machines, it is possible to obtain a planar laminated diffuser plate having a layer of the above described composition. Moreover, when forming a laminated diffuser plate, antistatic resin composition may be used on a surface layer thereof, preferably on the surface layer of the light-source side.

The thickness of the light diffuser plate in the backlight device of the present invention is preferably 0.8 to 10 mm, and more preferably 1 to 5 mm. While a thinner sheet helps to obtain brighter, lighter, and more economical device, for thicknesses smaller than 0.8 mm, the light diffuser plate will lack mechanical strength thereby causing deflection and like, and for thicknesses grater than 10 mm, on the other hand, the manufacturing thereof may be difficult.

Moreover, in order to enhance the commercial value of resulting backlight device, it is possible to add to the diffuser plate with other additives such as antistatic agent, inorganic pigments, and various stabilizers by a small amount within the range for achieving the purposes of the present invention. Furthermore, for the purpose of adjustment of the luminous intensity of the backlight device which is the resulting product, it is possible to make the surface of the mold to be like a mat, a prism, a light pattern, and the like simultaneously with or separately from the molding of the diffuser plate.

EXAMPLES

Hereafter, the present invention will be described in more detail with reference to examples, but the present invention will not be limited by these examples.

The configuration of the extrusion machine used for fabricating the light diffuser plate used in the backlight device of the present invention is as follows.

Extruding machine: Screw diameter 65 mm (L/D=28), single axis, with vent (SE65CVA; Manufactured by TOSHIBA MACHINE Co., Ltd.), Die: T die, Lip width 100 mm, Lip separation 5 mm, Roll: 3 Polishing rolls, vertical type.

Further, measurement methods and evaluation methods of various material properties used for the examples will be shown below.

(1) Average Particle Diameter and Coefficient of Variation (CV Value) of Light Diffusing Agent The light diffusing agents used in the examples and comparative examples are observed by a scanning electron microscope (SEM) and a number-average particle diameter and standard deviation for the number-average particle diameter were calculated by measuring the particle diameters of 200 particles using the obtained photograph.

Moreover, coefficient of variation (CV value) represented by percentage (%) was determined by the following equation:

CV=(standard deviation for average particle diameter/average particle diameter)×100

(2) General Optical Properties (Total Light Transmittance and Haze Value)

General optical properties (total light transmittance and haze value) of formed specimens were obtained by measuring specimens which were cut from the light diffuser plate of 2 mm thickness obtained through the above described extrusion into any size suitable for the measurement using a haze meter (DIGITAL HAZE COMPUTER: manufactured by Suga Test Instruments, Co., Ltd.)

(3) Measurement of the Amount of Ultraviolet Rays at the Light-Source Side of the Diffuser Plate and the Distance Between the Lamp and the Diffuser Plate First, an evaluation liquid crystal TV set A which is the test apparatus will be described. The diffuser plate and liquid crystal panel of a commercially available 20 inch liquid crystal TV (LC-20C3, manufactured by SHARP CORPORATION) were detached and the diffuser plate (specimen) B to be tested and a transparent glass E were attached. Moreover, in FIG. 1, C denotes a cold cathode tube, D a reflector, and F a laser displacement meter (LK-035, manufactured by KEYENCE CORPORATION), and the cold cathode tube C, the reflector D, and the diffuser plate B constitute a backlight device. The cold cathode tube C and the reflector D are disposed at the backside of the diffuser plate B, and the transparent glass E (liquid crystal panel) is disposed at the frontside of the diffuser plate B. The diffuser plate B which is the specimen is mounted by constraining its peripheral edge.

Then, formed specimen B was made by cutting the light diffuser plate of 2 mm thickness obtained through the above descried extrusion into pieces of 325 mm long and 420 mm wide. This formed specimen B was incorporated into the evaluation liquid crystal TV set A, and the amount of energy of ultraviolet rays at the light-source side surface of the diffuser plate was measured using a ultraviolet ray meter (UVR-2, manufactured by TOPCON CORPORATION, UD36 for wavelengths 300 to 400 nm, and UD 25 for wavelengths 300 nm or less at light receiving part). At this moment, the ultraviolet illuminance at wavelengths 300 to 400 nm immediately above the lamp (cold cathode tube C) was 33 $\mu W/cm^2$. Also, the ultraviolet illuminance at wavelengths not greater than 300 nm was 82 $\mu W/cm^2$. The distance between the lamp and the diffuser plate surface at this moment was 11.7 mm.

(4) Measurement of Saturated Water Absorption Rate

The light diffuser plate of 2 mm thickness obtained through the above described extrusion was cut into pieces of 100 mm long and 290 mm wide to obtain formed specimens. The formed specimens were dried in vacuum at 50° C. under 5 mmHg for 3 days, and the mass of the formed specimen in bone-dry condition was measured. Thereafter, the bone-dried formed specimens were moisture conditioned at 60° C. under a humidity of 90% for 200 hours, and then the mass of the formed specimen was measured to obtain the mass of the formed specimen which has absorbed water at 60° C. under a humidity of 90%. Saturated water absorption rate represented by percentage (%) was determined according to the following equation.

Saturated water absorption rate=[(mass of formed specimen in water absorbed condition)−(mass of formed specimen in bone-dry condition)]/(mass of formed specimen in bone-dry condition)×100

(5) Measurement of Dimensional Change Ratio

The light diffuser plate of 2 mm thickness obtained through the above described extrusion was cut into pieces of 100 mm long and 290 mm wide to obtain formed specimens. The formed specimens were dried in vacuum at 50C under 5 mmHg for 3 days, and the width dimension of the formed specimen in bone-dry condition was measured. Then, after the bone-dried formed specimen were moisture conditioned at 60° C. under a humidity of 90% for 200 hours, the width dimension was measured to provide the width dimension of the formed specimen which has absorbed water at 60° C. under a humidity of 90%. Then, the dimensional change ratio represented by percentage (%) was determined according to the following equation.

Dimensional change ratio=[(width dimension of the formed specimen in water absorbed condition)−(width dimension of the formed specimen in bone-dry condition)]/(width dimension of the formed specimen in bone-dry condition)×100

(6) Evaluation of Warp

The light diffuser plate of 2 mm thickness obtained through the above described extrusion was cut into pieces of 325 mm long and 420 mm wide to obtain formed specimens. After being moisture conditioned at 45° C. under a humidity of 95% for 200 hours, a formed specimen was installed into the evaluation liquid crystal TV set of FIG. 1, and the cold cathode tube C was turned on, and the displacement toward the side of the transparent glass E was measure using a laser displacement meter F. Then, the warp was evaluated according to the following criteria.

Good: Maximum displacement toward the side of transparent glass E is smaller than a reference value: judged to be small warp Poor: Maximum displacement toward the side of transparent glass E is larger than a reference value: judged to be large warp (7) Evaluation of Ultraviolet Resistance The light diffuser plate of 2 mm thickness obtained through the above described extrusion was cut into pieces of 50 mm long and 50 mm wide to obtain formed specimens. As the evaluation test for the ultraviolet resistance, the above described specimens were exposed for 500 hours using a Xenon weatherometer (ATRAS CI-65 Type, TOYO SEIKI SEISAKU-SHO, LTD). The formed specimens after exposure were measured in terms of the color difference ($\Delta E$) using the Color Computer (SM-4-2, manufactured by Suga Test Instruments Co., Ltd.), and the evaluation of ultraviolet resistance was performed according to the following criteria.

Good $\Delta E$ is less than 2.0 : judged to have good ultraviolet resistance.

Poor $\Delta E$ is greater than 2.0 : judged to have poor ultraviolet resistance.

Example 1

(1) Following components were mixed to prepare a monomer phase liquid.

Monomer component:

| | |
|---|---|
| Methyl methacrylate | 180 kg |
| Styrene | 120 kg |
| n-Octyl mercaptan | 0.600 kg |

Polymerization initiator:

PEROCTA O (from NOF CORPORATION) 1.20 kg (2) Then, the following components were resolved and mixed to prepare aqueous phase liquid.

| | |
|---|---|
| Distilled water | 600 kg |
| Polyvinyl alcohol (PVA-217; manufactured by KURARAY CO., LTD.) | 3.91 kg |
| Sodium lauryl sulfate | 0.200 kg |
| Sodium acid carbonate | 0.306 kg |
| Sodium nitrite | 0.392 kg |

After charging monomer phase liquid and aqueous phase liquid into a polymerization chamber having a volume of 1 m³, the mixture was polymerized at 75° C. for 8 hours under nitrogen atmosphere while stirring at a revolution speed of 70 rpm. The yield (polymer yield with respect to monomer charge) of that moment was 98%. The mixture was further kept at 132° C. for 6 hours, eventually completing the polymerization. The dispersion obtained by polymerization was washed, dewatered, and dried and thereafter, was subjected to an extrusion machine to obtain methacryl-styrene copolymer resin in the form of pellet.

The methacryl-styrene copolymer resin pellet obtained through the above described polymerization, 2.3% by mass of siloxane polymer particle (TOSPEARL 2000B; manufactured by GE Toshiba Silicones Co., Ltd, number-average particle diameter of 5 μm, and CV value of 8%), and 0.1% by mass of 2-(5-methyl-2hydroxyphenyl)benzotriazole were mixed by a Henschel mixer and thereafter, the mixture was melted and kneaded using an extrusion machine to fabricate a light diffuser plate of 1000 mm wide and 2 mm thick at an extrusion resin temperature of 235° C. The evaluation results of the obtained light diffuser plate are shown in Table 1.

Example 2

The methacryl-styrene copolymer resin pellet obtained through the polymerization according to example 1, and 2.3% by mass of siloxane polymer particle (TOSPEARL 2000B: manufactured by GE Toshiba Silicones Co., Ltd., number-average particle diameter of 5 mm, CV value of 8%) were mixed by a Henschel mixer and thereafter, the mixture was melted and kneaded by using an extrusion machine to fabricate a light diffuser plate of 1000 mm wide and 2 mm thick at an extrusion resin temperature of 235° C. Evaluation results of the obtained light diffuser plate are shown in Table 1.

Example 3

(1) Monomer phase liquid was prepared by mixing the following components.

Monomer component:

| | |
|---|---|
| Methyl methacrylate | 135 kg |
| Styrene | 165 kg |
| n-Octyl mercaptan | 0.600 kg |
| Polymerization initiator: | |
| PEROCTA O (from NOF CORPORATION) | 1.20 kg |

(2) Then, the following components were resolved and mixed to prepare aqueous phase liquid.

| | |
|---|---|
| Distilled water | 600 kg |
| Polyvinyl alcohol (PVA-217; manufactured by KURARAY CO., LTD.) | 3.91 kg |
| Sodium lauryl sulfate | 0.200 kg |
| Sodium acid carbonate | 0.306 kg |
| Sodium nitrite | 0.392 kg |

After charging the monomer phase liquid and the aqueous phase liquid into a polymerization chamber having a volume of 1m³, the mixture was polymerized at 75° C. for 8 hours under nitrogen atmosphere while stirring at a revolution speed of 70 rpm. The yield (polymer yield with respect to monomer charge) of that moment was 97%. The mixture was further kept at 132° C. for 6 hours, eventually completing the polymerization. The dispersion obtained by polymerization was washed, dewatered, and dried and thereafter, was subjected to an extrusion machine to obtain methacryl-styrene copolymer resin in the form of pellet.

The methacryl-styrene copolymer resin pellet obtained through the above described polymerization, and 1.9% by mass of siloxane polymer particle (TOSPEARL 2000B; manufactured by GE Toshiba Silicones Co., Ltd., number-average particle diameter of 5 μm, and CV value of 8%) were mixed by a Henschel mixer and thereafter, the mixture was melted and kneaded using an extrusion machine to fabricate a light diffuser plate of 1000 mm wide and 2 mm thick at an extrusion resin temperature of 200° C. The evaluation results of the obtained light diffuser plate are shown in Table 1.

Comparative Example 1

Methyl methacrylate resin (PARAPET EH: manufactured by KURARAY CO., LTD) and 5.2% by mass of siloxane polymer particle (TOSPEARL2000B; manufactured by GE Toshiba Silicones Co., Ltd., number-average particle diameter of 5 μm, and CV value of 8%) were mixed by a Henschel mixer and thereafter, the mixture was melted and kneaded using an extrusion machine to fabricate a light diffuser plate of 1000 mm wide and 2 mm thick at an extrusion resin temperature of 255° C. The evaluation results of the obtained light diffuser plate are shown in Table 1.

Comparative Example 2

Styrene resin (GPPS-HH102: manufactured by A&M STYRENE Co., Ltd) and 3% by mass of methyl polymethacrylate cross-linked polymer particle (MBXR-8N: manufactured by SEKISUI PLASTICS CO., Ltd., number-average particle diameter of 8 μm, and CV value of 42%) were mixed by a Henschel mixer and thereafter, the mixture was melted and kneaded using an extrusion machine to fabricate a light diffuser plate of 1000 mm wide and 2 mm thick at an extrusion resin temperature of 200° C. The evaluation results of the obtained light diffuser plate are shown in Table 1.

Comparative Example 3

(1) The following components were mixed to prepare monomer phase liquid.
Monomer component:

| | |
|---|---|
| Methyl methacrylate | 240 kg |
| Styrene | 60 kg |
| n-Octyl mercaptan | 0.600 kg |
| Polymerization initiator: | |
| PEROCTA ® O (from NOF CORPORATION) | 1.20 kg |

(2) Then, the following components were resolved and mixed to prepare aqueous phase liquid.

| | |
|---|---|
| Distilled water | 600 kg |
| Polyvinyl alcohol (PVA-217; manufactured by KURARAY CO., LTD.) | 3.91 kg |
| Sodium lauryl sulfate | 0.200 kg |
| Sodium acid carbonate | 0.306 kg |
| Sodium nitrite | 0.392 kg |

After charging the monomer phase liquid and the aqueous phase liquid into a polymerization chamber having a volume of 1 m$^3$, the mixture was polymerized at 75° C. for 8 hours under nitrogen atmosphere while stirring at a revolution speed of 70 rpm. The yield (polymer yield with respect to monomer charge) at that moment was 99%. The dispersion obtained by the polymerization was washed, dewatered, and dried and thereafter, was subjected to an extrusion machine to obtain methacryl-styrene copolymer resin in the form of pellet.

The methacryl-styrene copolymer resin pellet obtained through the polymerization described above, and 3.7% by mass of siloxane polymer particle (TOSPEARL 2000B; manufactured by GE Toshiba Silicones Co., Ltd, number-average particle diameter of 5 μm, and CV value of 8%) were mixed by a Henschel mixer and thereafter, the mixture was melted and kneaded using an extrusion machine to fabricate a light diffuser plate of 1000 mm wide and 2 mm thick at an extrusion resin temperature of 240° C. The evaluation results of the obtained light diffuser plate are shown in Table 1.

Comparative Example 4

Polycarbonate resin (PANLIGHT-1330Y: manufactured by TEIJINKASEI Co., Ltd.) and 3% by mass of siloxane polymer particle (TOSPEARL 2000B; manufactured by GE Toshiba Silicones Co., Ltd., number-average particle diameter of 2 μm, and CV value of 3%) were mixed by a Henschel mixer and thereafter, the mixture was melted and kneaded using an extrusion machine to fabricate a light diffuser plate of 1000 mm wide and 2 mm thick at an extrusion resin temperature of 300° C. The evaluation results of the obtained light diffuser plate are shown in Table 1. It is seen that although this light diffuser plate exhibits a low saturated water absorption rate as well as good result in the warp evaluation in the liquid crystal TV, it has a poor ultraviolet resistance.

Figure 2:
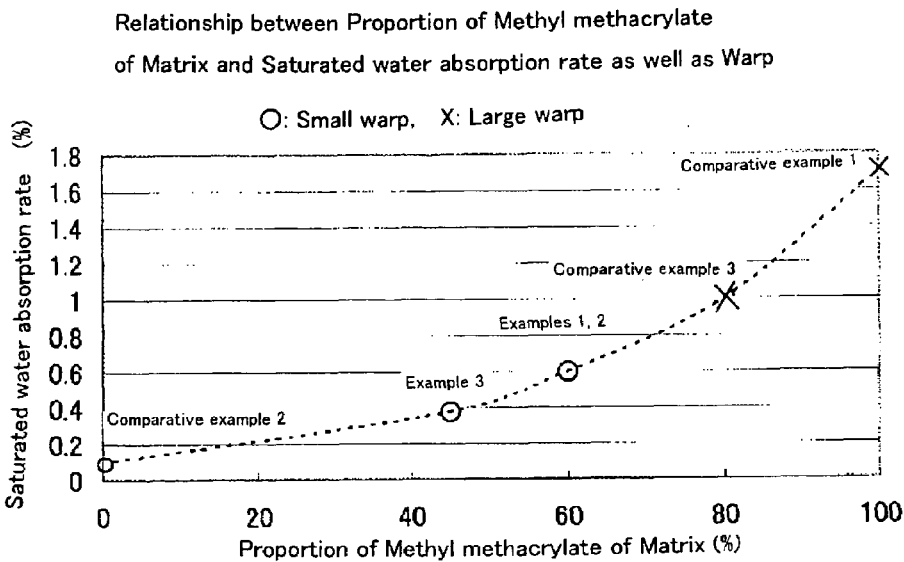
FIG. 2 illustrates a graph to show the relationship between the proportion of methyl methacrylate monomer in the matrix and the saturated water absorption rate as well as the warp evaluation.

Then, a graph was created based on Table 1. FIG. 2 is a graph showing the relationship between the proportion of methyl methacrylate monomer (MMA proportion) of the matrix and saturated water absorption rate as well as warp evaluation. Moreover, FIG. 3 is a graph showing the relationship between the proportion of methyl methacrylate monomer of the matrix and color difference as well as ultraviolet resistance.

Figure 3:
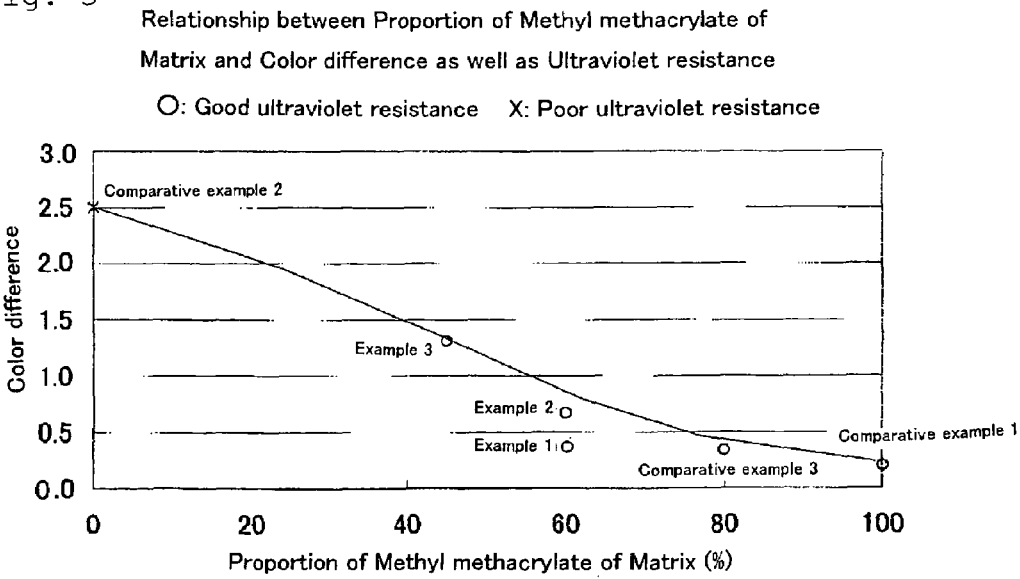
FIG. 3 illustrates a graph to show the relationship between the proportion of methyl methacrylate monomer and the color difference as well as the ultraviolet resistance.

From the relationship between the proportion of methyl methacrylate monomer (in other words, proportion of styrene) and ultraviolet resistance evaluation in the examples 1 to 3 shown in Table 1 and FIG. 3, it is seen that as the proportion of methyl methacrylate monomer increases, the ultraviolet resistance is enhanced.

Moreover, from the relationship between the proportion of methyl methacrylate (in other words, proportion of styrene) constituting the inner layer in the examples 1 to 3 and the comparative examples 1 to 3 shown in Table 1 and FIG. 2, and the saturated water absorption rate, dimensional change ratio and warp evaluation, it is seen that the lower the proportion of methyl methacrylate monomer is, the lower the saturated water absorption rate and dimensional change ratio are, as well as the smaller the warp in the installation of liquid crystal TV is.

Moreover, from the results shown in Table 1 and FIG. 3, it is seen that by adding ultraviolet absorbing agent to the light diffuser plate, the ultraviolet resistance thereof will be enhanced.

TABLE 1

| | | | Example 1 | Example 2 | Example 3 | Comparative example 1 | Comparative example 2 | Comparative example 3 | Comparative example 4 |
|---|---|---|---|---|---|---|---|---|---|
| Resin Layer | Matrix | MMA proportion (%) | 60 | | 45 | 100 | 0 | 80 | Polycarbonate K-1330Y |
| | | Styrene proportion (%) | 40 | ← | 55 | 0 | 100 | 20 | |
| | Light diffusing agent | Name | TOSPEARL 2000B | ← | ← | ← | MBXR-8N | TOSPEARL 2000B | TOSPEARL120 |
| | | Number-average particle diameter (μm) | 5 | ← | ← | ← | 8 | 5 | 2 |
| | | CV value (%) | 8 | ← | ← | ← | 42 | 8 | 3 |
| | | Loadings (% by mass) | 2.3 | ← | 1.9 | 5.2 | 3 | 3.7 | 3 |
| | Ultraviolet absorb- | Name | 2-(5-methyl-2-hydroxyphenyl)benzotriazole | None | None | None | None | None | None |

TABLE 1-continued

|  |  |  | Example 1 | Example 2 | Example 3 | Comparative example 1 | Comparative example 2 | Comparative example 3 | Comparative example 4 |
|---|---|---|---|---|---|---|---|---|---|
|  | ing agent | Loadings (%) | 0.1 | — | — | — | — | — | — |
| Evaluation of Light Diffuser Plate | Saturated water absorption rate (%) |  | 0.65 | 0.65 | 0.38 | 1.7 | 0.1 | 1 | 0.4 |
|  | General optical property | Total light transmission (%) | 65.9 | 66.1 | 69.2 | 72.2 | 73.0 | 69.4 | 50.3 |
|  |  | Haze (%) | 94.2 | 94.0 | 94.3 | 94.3 | 94.2 | 94.4 | 94.0 |
|  | Dimensional change ratio (%) |  | 0.13 | 0.13 | 0.07 | 0.43 | 0.016 | 0.26 | 0.07 |
|  | Warp toward transparent glass side (mm) |  | 0.7 | 0.7 | 0.5 | 2.8 | 0.1 | 2.2 | 0.3 |
|  | Color difference (ΔE) |  | 0.35 | 0.67 | 1.31 | 0.2 | 2.5 | 0.34 | 6.2 |
|  | Warp evaluation |  | Good | Good | Good | Poor | Good | Poor | Good |
|  | Ultraviolet resistance evaluation |  | Good | Good | Good | Good | Poor | Good | Poor |

INDUSTRIAL APPLICABILITY

As seen from what has been described so far, in a backlight device for a liquid crystal display comprising a light diffuser plate, a light source disposed at the backside of the light diffuser plate, and a light reflector for reflecting the light from the light source, in which a liquid crystal panel is disposed at the frontside of the light diffuser plate, and the direct light from the light source and the reflected light from the light reflector diffuse into and pass through said light diffuser plate thereby illuminating the liquid crystal panel from backside, the backlight device for a liquid crystal display of the present invention is advantageous in that: it exhibits excellent light diffusivity; it is less likely to experience deformation such as warping or deflection of the light diffuser plate which is the light emitting surface; and it also has excellent ultraviolet resistance thereby suppressing the yellowish tone of the transmitted light.

The invention claimed is:

1. A backlight device for a liquid crystal display, comprising at least a light diffuser plate, a light source disposed at a backside of the light diffuser plate, and a reflector for reflecting light from the light source, wherein a liquid crystal panel is disposed at a frontside of the light diffuser plate, and direct light from said light source and reflected light from said reflector diffuse into and transmit through said light diffuser plate to illuminate said liquid crystal panel from backside, said backlight device for a liquid crystal display being configured such that:

said light source radiates ultraviolet rays and heat along with visual light, and said light diffuser plate is constrained at at least one side thereof, and has a saturated water absorption rate of not more than 0.9% as well as a color difference (ΔE) of not greater than 2.0 as specified in JIS K 7105 after being exposed for 500 hours to an artificial light used for an artificial light source test specified in JIS K7350-2.

2. The backlight device for a liquid crystal display according to claim 1, wherein said light diffuser plate consists of light diffusive (meth) acryl-styrene copolymer resin.

3. The backlight device for a liquid crystal display according to claim 1, wherein said light diffuser plate contains 0.005 to 2 parts by mass of an ultraviolet absorbing agent with respect to 100 parts by mass of the resin constituting said light diffuser plate.

4. The backlight device for a liquid crystal display according to claim 1, wherein the light diffuser plate contains 0.1 to 20 parts by mass of particulates with a particle diameter 1 to 30 μm with respect to 100 parts by mass of the resin constituting said light diffuser plate.

5. The backlight device for a liquid crystal display according to claim 1, wherein a maximum value of light energy at wavelengths 300 to 400 nm at a surface of the light-source side of the light diffuser plate is not less than 20 μW/cm$^2$.

6. The backlight device for a liquid crystal display according to claim 1, wherein the maximum value of light energy at wavelengths not greater than 300 nm at the surface of the light-source side of the light diffuser plate is not less than 50 μW/cm$^2$.

7. The backlight device for a liquid crystal display according to claim 5, wherein the maximum value of light energy at wavelengths not greater than 300 nm at the surface of the light-source side of the light diffuser plate is not less than 50 μW/cm$^2$.

8. The backlight device for a liquid crystal display according to claim 2, wherein said (meth)acryl-styrene copolymer resin comprises copolymer of 30 to 70% by mass of (meth) acrylate ester monomer and 70 to 30% by mass of styrene monomer.

9. The backlight device for a liquid crystal display according to claim 2, wherein said (meth)acryl-styrene copolymer resin comprises copolymer of 40 to 60% by mass of (meth) acrylate ester monomer and 60 to 40% by mass of styrene monomer.

10. The backlight device for a liquid crystal display according to claim 2, wherein said (meth)acrylstyrene copolymer resin comprises copolymer of 45 to 55% by mass of (meth) acrylate ester monomer and 55 to 45% by mass of styrene monomer.

* * * * *